United States Patent
Dijoud et al.

(10) Patent No.: US 9,194,253 B2
(45) Date of Patent: Nov. 24, 2015

(54) FLEXIBLE REAR BEARING MOUNTING, HAVING AN ABUTMENT, FOR A TURBINE ENGINE

(75) Inventors: Marc Maurice Dijoud, Ousse (FR); Jean-Luc Pierre Sahores, Mazeres-Lezons (FR); Jean-Maurice Casaux-Bic, Buziet (FR)

(73) Assignee: TURBOMECA, Bordes (FR)

( * ) Notice: Subject to any disclaimer, the term of this patent is extended or adjusted under 35 U.S.C. 154(b) by 762 days.

(21) Appl. No.: 13/581,038

(22) PCT Filed: Feb. 24, 2011

(86) PCT No.: PCT/FR2011/050390
§ 371 (c)(1),
(2), (4) Date: Aug. 24, 2012

(87) PCT Pub. No.: WO2011/107694
PCT Pub. Date: Sep. 9, 2011

(65) Prior Publication Data
US 2012/0321447 A1    Dec. 20, 2012

(30) Foreign Application Priority Data
Feb. 25, 2010    (FR) ...................................... 10 51358

(51) Int. Cl.
*F01D 25/16* (2006.01)
*F01D 9/04* (2006.01)

(52) U.S. Cl.
CPC .............. *F01D 25/164* (2013.01); *F01D 9/041* (2013.01); *Y02T 50/673* (2013.01)

(58) Field of Classification Search
CPC ....... F01D 9/041; F01D 9/042; F01D 25/162; F01D 25/164
USPC ...................... 415/135–138, 142, 229; 60/799
See application file for complete search history.

(56) References Cited

U.S. PATENT DOCUMENTS

| 2,869,941 | A | 1/1959 | Shoup, Jr. et al. |
| 4,302,062 | A | 11/1981 | Hunter, Jr. et al. |
| 5,634,767 | A | 6/1997 | Dawson |
| 2009/0155071 | A1 | 6/2009 | Lescure et al. |

FOREIGN PATENT DOCUMENTS

| EP | 2 071 142 | 6/2009 |
| FR | 1 346 653 | 12/1963 |
| GB | 595 346 | 12/1947 |
| GB | 952774 | 3/1964 |

OTHER PUBLICATIONS

International Search Report issued on Jun. 17, 2011 in PCT/FR11/050390 filed on Feb. 24, 2011.

*Primary Examiner* — Edward Look
*Assistant Examiner* — Jesse Prager
(74) *Attorney, Agent, or Firm* — Oblon, McClelland, Maier & Neustadt, L.L.P.

(57) ABSTRACT

An assembly including a part for mounting at least one shaft bearing of a turbine engine and a support part that forms an abutment for the mounting part. The mounting part includes at least one channel through which engine gases pass, and connection parts that are capable of connecting the channel to an outer structure of the engine and to a housing holding the bearing. At least one of the connection parts is flexible so as to enable radial movement of the channel, an amplitude of the radial movement being limited by at least one of the elements of the mounting part coming onto an abutment supported by the support part. The support part extends longitudinally with regard to the direction of the rotational axis of the turbine engine so as to generate a turbine shroud that is configured to be positioned in alignment with a turbine wheel of the turbine engine.

5 Claims, 3 Drawing Sheets

FLEXIBLE REAR BEARING MOUNTING, HAVING AN ABUTMENT, FOR A TURBINE ENGINE

The field of the present invention is that of aeronautical turbomachines and, more particularly, that of their components that contribute to the mounting of the bearings of their rotational shafts.

Aeronautical turbomachines, whether single-spool or multi-spool, generally comprise one or more structural components, known as bearing mountings, which support the bearing or bearings on which the rotation shafts of these spools rotate. Such components may also support the power shaft driven by the free turbine in the case of a turboshaft engine. In the case of bearing mountings for the rear bearings, these are subjected to relatively high thermal stresses because they are attached to the exterior case of the engine by a flange which is situated in a cold zone whereas their central part, in the form of a duct, has the gases from the engine passing through it and is therefore situated in a zone that is particularly hot. Toward the inside of the engine they are attached to a set of components that form a casing in which the bearings for mounting the rotation shafts are located. These casings are likewise situated in a zone that is relatively cold because it is swept by the engine cooling air and by the bearing lubricating oil. The differential radial movements likely to occur during operation as a result of these differences in temperature between the various parts that make up this mounting have therefore to be taken into consideration.

For this purpose, the mountings for the rear bearings generally take the form of an annular duct through which the gases pass and across which structural arms pass, this duct being extended outward and inward by two parts with complex geometries known as hairpins.

These hairpins connect the rigid central part carrying the bearing to the exterior part while at the same time allowing the radial movements caused by the temperature differences. In the current state of the art, these hairpins are axisymmetric or partially perforated in order to increase their flexibility while at the same time ensuring that the bearing has sufficient stiffness.

Indeed, in the particular case of a design incorporating a rear bearing mounting, there are two opposing objectives to be achieved when designing this mounting: firstly, it is necessary to have sufficient stiffness in order to drive the sizing of the run of shafts and limit the extent to which the rotors move under a load factor (which means when the turbomachine is subjected to accelerations transverse to its axis of rotation) and second, it is necessary, through the sizing of the lower and outer hairpins, to ensure that the bearing mounting is sufficiently flexible with a view to extending the life of the component.

This component, which is a casting or of all-welded construction, is complex and therefore has a high cost of manufacture; moreover, its in-service mechanical reliability may generate additional costs which are not insignificant and are due either to numerous repairs or to premature need to scrap the component. In order to improve its durability, it is important for such a component to be designed with the greatest possible flexibility at its hairpins, while at the same time guaranteeing that the entire assembly is sufficiently stiff so that it maintains the alignment of the run of shafts it supports.

Embodiments of such components are given by patent application GB 952774 or FR 1346653, but these components are produced by combining special-purpose components that have the sole function of ensuring the desired flexibility. They do not cover high duty integration into the turbine moving parts.

It is an object of the present invention to meet such an objective by proposing a rear bearing mounting with improved life, which provides stable retention of the bearings of the rotation shaft it supports and which can be produced with the greatest possible reduction in the number of components present in a turbine module. A turbine module is an assembly of components, comprising at least one turbine wheel, which are combined with one another in such a way as to constitute an independent turbomachine subassembly; this subassembly can thus be assembled with the other modules or removed from the turbomachine as a single piece which is mechanically independent.

To this end, one subject of the invention is an assembly consisting of a mounting component for mounting at least one bearing of a turbomachine shaft and of a support component forming an abutment for said mounting component, said mounting component comprising at least one duct through which the gases from the engine pass and connecting components able to connect said duct firstly to the external structure of the engine and secondly to a casing carrying said bearing, at least one of the connecting components being flexible so as to allow a radial movement, with reference to the orientation of the axis of rotation of said shaft, of said duct, the amplitude of said radial movement being limited by at least one of the elements of the mounting component coming into abutment with an abutment carried by said support component, characterized in that said support component is extended longitudinally, with reference to the direction of the axis of rotation of the turbomachine, in such a way as to generate a turbine shroud intended to be positioned facing a turbine wheel of the turbomachine.

This then makes the radial rigidity of the component vary according to whether or not it is in contact with the abutment, and also yields great flexibility when it is not interacting with the abutment. Because most of the thermomechanical fatigue loadings occur when the component is not against the abutment, a component is obtained in which the stresses developed are lower, giving it an increased lifespan. The increased flexibility obtained when not against the abutment improves the overall behavior of the component subjected to differential thermal expansions. A radial abutment connected to the structure of the turbomachine is added in order to limit the non-axisymmetric additional movements that are connected with loadings of the aircraft maneuver or gyroscopic loading type, by bringing one of the elements of the bearing mounting into contact with this abutment.

These connecting components, or hairpins, may be attached to said duct or form an integral part of the complete component.

However, even in the event of permanent contact of the abutment with part of the bearing mounting (duct or structural hairpin), it is possible to optimize the life of the structural hairpins under the loading associated with the differential thermal expansions, because the components are not rigidly connected to one another (sliding contact). Fretting and wear phenomena may then be observed, but these do not have any major impact on the function of the various components or, in particular, on the permanency of the effect on the radial rigidity.

In order to reduce the number of components that have to be used and to simplify production of the turbine module, the abutment is positioned at the end of a support component attached to a flange of the external structure of the engine, which consists of a longitudinal extension of a turbine shroud positioned facing a turbine wheel of the turbomachine.

Advantageously, the connecting component for connecting to the external structure and the support component are both configured to be fixed to the same flange of the external structure of the turbomachine.

In one particular embodiment, the abutment interacts with one of the connecting components for connecting to the external structure.

In another particular embodiment, the abutment interacts directly with the duct.

In another particular embodiment, the abutment interacts with the connecting component for connecting to the casing that carries said bearing.

In yet another particular embodiment, the mounting component comprises an abutment interacting with the connecting component for connecting to the external structure and an abutment interacting with the connecting component for connecting to the casing that carries said bearing.

The invention also relates to a turbomachine comprising at least one mounting component for mounting one of the bearings of a rotation shaft, as described hereinabove.

The invention will be better understood, and other objects, details, features and advantages thereof will become more clearly apparent during the course of the detailed explanatory description which follows, of one or more embodiments of the invention which are given by way of purely illustrative and nonlimiting examples, with reference to the attached schematic drawings.

In the description, the terms radial, axial and longitudinal relate to the axis of rotation of the turbomachine whereas the terms upstream and downstream refer to the direction in which the gases flow through this same turbomachine. In these drawings.

Figure 1:
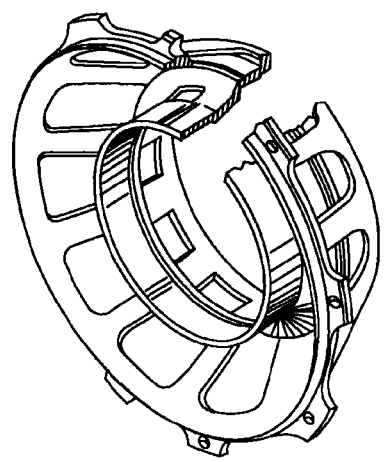
FIG. 1 is a perspective view of a rear bearing mounting with hairpin, according to an embodiment of the prior art.

FIG. 1 shows a bearing mounting as described in American U.S. Pat. No. 5,161,940. In the example of that patent the flexible cage technology is applied only to the bearing mounting described and does not extend to a bearing mounting incorporating part of the flow path duct. This is because these components present additional technical difficulties in terms of their design and engineering, namely the optimization in terms of life under thermomechanical loading and aerodynamic performance.

Figure 2:
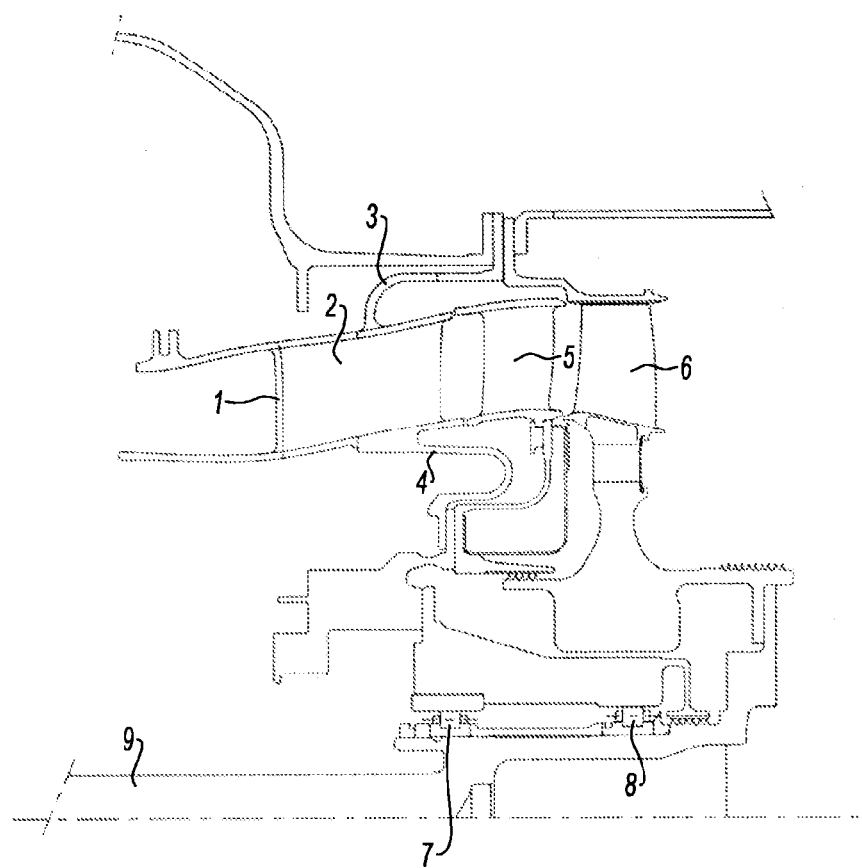
FIG. 2 is a view in cross section of a turbine engine comprising a bearing mounting with hairpin.

Reference is made to FIG. 2 which shows the part situated downstream of the high-pressure turbine of the gas generator of a turbine engine comprising a hairpin-type bearing mounting. This bearing mounting has structural hairpins which are perforated but only to the extent permitted by a radial stiffness objective made necessary by the retention of the run of shafts during normal operation and under the loadings of maneuvering. The gases from the gas generator pass through a duct 2 between the turbines which is connected by means of an outer hairpin 3 to the external structure of the engine and by means of an inner hairpin 4 to the bearing casing. The assembly consisting of the duct 2 between the turbines and the two hairpins 3 and 4 constitutes the rear bearing mounting 1 of the engine. Downstream of this rear bearing mounting the gases pass through the nozzle guide vanes of a free turbine 5 then through the free turbine wheel 6 to which they transmit their energy. The free turbine wheel is mechanically connected to the drive shaft 9 which rotates with respect to the structure via two bearings 7 and 8 and which recovers the power from the engine. These two bearings are themselves carried by the engine structure, to which they are connected by the rear bearing mounting 1.

In this configuration of the prior art, the upper hairpin is only slightly perforated on its circumference, in order to give the bearing mounting a little flexibility but within strict limits in order not to impair the radial stiffness of the component or the retention of the bearings. The flexibility of the hairpin of the bearing mounting is therefore relatively limited; as a result, its freedom of movement is not enough to respond to the radial loadings of thermomechanical origin, and the bearing mounting therefore has insufficient endurance.

Figure 3:
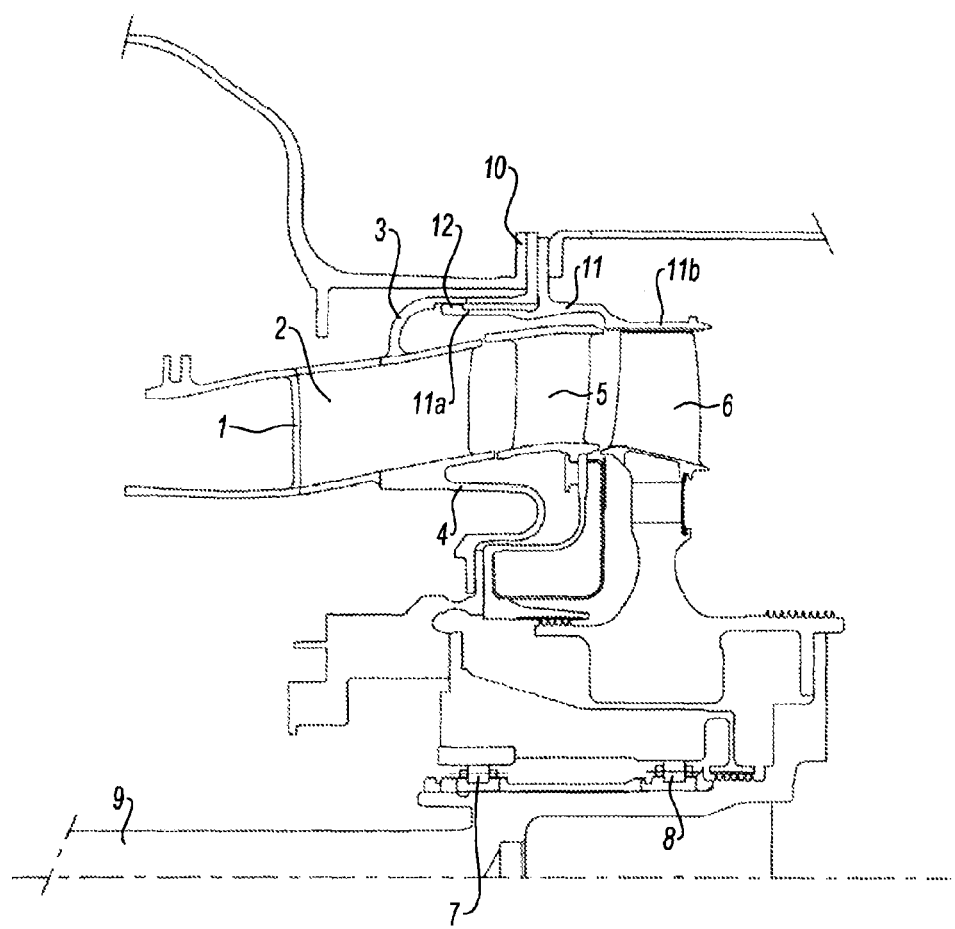
FIG. 3 is a view in cross section of a turbine engine according to a first embodiment of the invention.

Reference is now made to FIG. 3 which shows a first embodiment of the invention. The upper hairpin 3 is attached, on the exterior side, to a flange 10 of the structure of the engine to which flange is also attached a turbine shroud 11 of the free turbine; the turbine shroud is the component which, by means of a rear extension 11b, provides radial sealing toward the outside of the gas flow path at the turbine wheel 6. In the first embodiment, the turbine shroud 11 also has a front extension 11a of annular shape, extending from the flange 10 toward the front of the engine and which at its front end has an outgrowth forming a radial abutment 12 on which the hairpin 3 is blocked when it is deformed and moves in the direction of the axis of rotation of the engine. The addition of the abutment 12 means that the hairpin 3 can be perforated to a greater extent, in the manner of a cage with bars, in order to increase its flexibility and its ability to absorb the differential thermal expansions between the duct and the outer flange.

Figure 4:
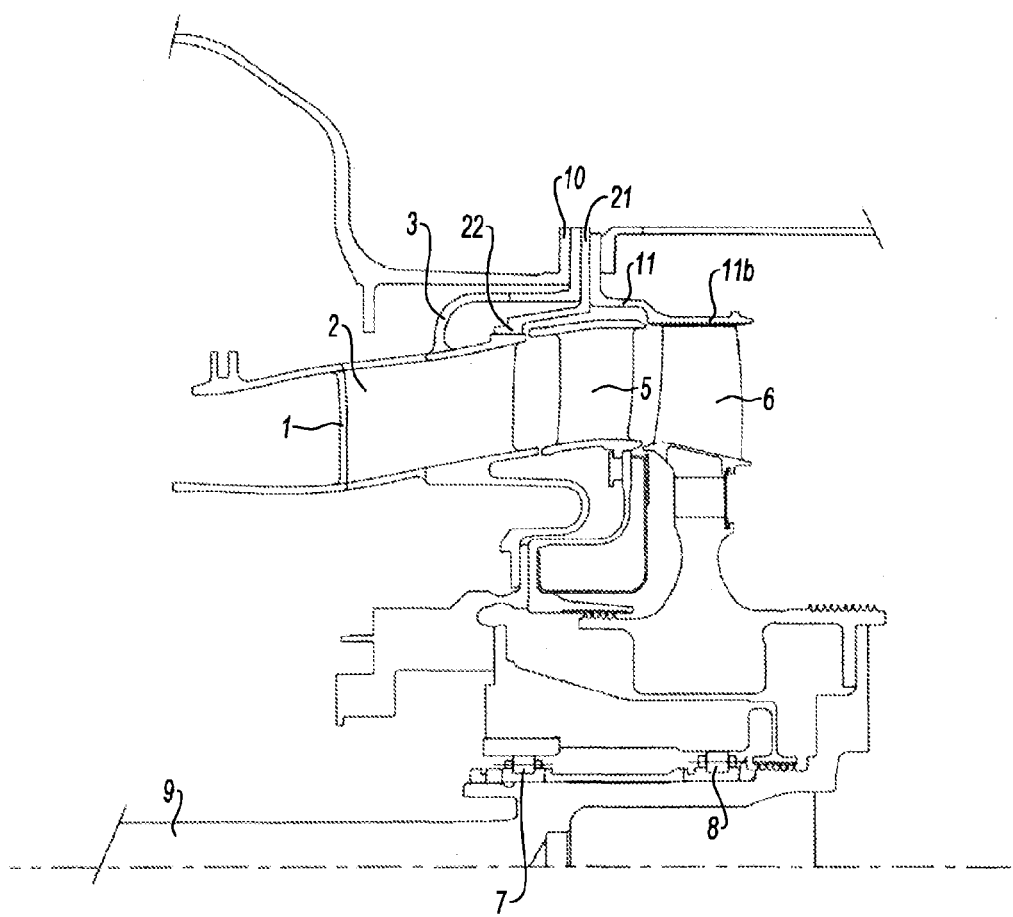
FIG. 4 is a view in cross section of a turbine engine according to a second embodiment of the invention.

Reference is made to FIG. 4 which shows a second embodiment of the invention. Those elements of the bearing mounting which are identical to the first embodiment are denoted by the same reference numeral and not described again. The hairpin 3 is attached in the same way to the flange 10, as also is the turbine shroud 11. In this configuration, this shroud has just one extension 11b, in the region of the turbine wheel 6, the extension 11a being omitted. A support component 21 of annular shape is, however, added, which is attached to the flange 10 and extends in the direction of the front of the engine. As before, this ends in a radial abutment 22 which this time is situated in the region of the rear end of the duct 2 of the bearing mounting 1, rather than facing the outer hairpin 3. It is depicted as preventing the duct 2 from moving toward the outside of the engine but, as in either embodiment the abutments are of annular shape, they act in similar ways; they limit movements of the bearing mounting by blocking it either using that part of the abutment that can be seen in the figure, or using the part which is diametrically opposite it.

Whether it is the first or the second embodiment that is being considered, the abutments 12 or 22 may, with the engine not running, and without this configuration being essential, be set back slightly (this is not depicted in the figures) with respect to that part of the upper hairpin 3 or of the duct 2 that faces them. This setting-back allows the bearing mounting 1 to move radially under thermomechanical loading as a result of the flexibility of the hairpins 3 and 4. This movement is possible as long as either the upper hairpin 3 in the first embodiment, or the duct 2 in the second, does not come into contact with the corresponding abutment. Beyond that, any transverse movement of the bearing mounting, associated with loadings of the aircraft maneuver type, is limited by the corresponding abutment and the flexibility in radial movement of the bearing mounting 1 afforded by the hairpins is eliminated because of this coming into abutment.

It is quite obvious that the rigidity of the front extensions, whether the extension 11a of the turbine shroud 11 or that of the support component 21, is high enough to halt the transverse movements of the bearing mounting 1 when this comes into abutment with the corresponding abutment 12 or 22.

The way in which the invention works according to the first embodiment will now be described. The working according to the second embodiment is exactly the same.

During operation, the bearing mounting 1 may be made to move under the effect of the thermomechanical loading or under the effect of a load factor applied to the aircraft. This movement may occur either in annular form when the stresses are evenly distributed about the periphery of the bearing mounting (which is the case with thermomechanical deformations) or in non-axisymmetric form (which is the case of a load factor). The hairpins 3 and 4, which in the invention are in the form of a flexible cage, are more slotted than they are in the prior art in order to afford them greater flexibility. As a result, the bearing mounting 1 moves more freely in response to these stresses as long as it is not against the abutment 12. This being so, the stresses do not develop in the hairpins and these therefore have better fatigue resistance and an extended lifespan.

Following a first deformation which is permitted by this increased flexibility, the hairpin 3 comes against the abutment 12, at least on one of its angular sectors when there are additional loadings, notably when the aircraft is maneuvering. The setback between the abutment and the bearing mounting is optimized so that these two components are not in contact with one another under thermomechanical loadings alone. This limit to the movement of the duct 2 is made necessary by the need to keep the bearing mounting rigid overall and keep the shaft aligned as closely as possible with the axis of symmetry of the engine.

However, as long as this limit has not been reached, the bearing mounting can be deformed more freely as a result of the flexibility of the hairpins 3 and 4. Whereas, in the prior art, the flexibility of hairpins was lower and stresses reached a high level more rapidly, which is detrimental to fatigue life, this development in the invention occurs at a later stage. As a result, there is a very marked improvement in the life of the bearing mountings 2.

The operation of this improved bearing mounting has been described with an abutment 12 or 22 that extends over the entire circumference of the engine. The invention can just as well be achieved with a plurality of abutments evenly distributed about this circumference. The abutments 12 and 22 depicted in annular shape are not necessarily axisymmetric components and may have breaks in axisymmetry (perforations, slots) in order to optimize their thermomechanical behavior.

Although the invention has been described in conjunction with a number of specific embodiments, it is quite obvious that it encompasses all technical equivalents of the means described and combinations thereof where these fall within the scope of the invention.

The invention claimed is:

1. An assembly comprising:
   a mounting component for mounting at least one bearing of a turbomachine shaft, the turbomachine including an external structure enveloping its moving parts and a casing carrying the bearing, the external structure and casing configured to be connected to one another by the mounting component; and
   a support component configured to be fixed to the external structure of the turbomachine and to form an abutment for the mounting component;
   the mounting component comprising at least one duct through which gases from the engine pass and connecting components which are configured to attach the duct firstly to the external structure of the engine and secondly to the casing;
   at least one of the connecting components being flexible to allow a radial movement of the duct, an amplitude of the radial movement being limited by at least one of elements of the mounting component coming into abutment with an abutment carried by the support component;
   wherein the support component comprises a rear extension extending longitudinally downstream beyond a longitudinal extension of the duct, with reference to a direction of an axis of rotation of the turbomachine, to generate an annulus that can act as a turbine shroud for a turbine wheel of the turbomachine.

2. The assembly as claimed in claim 1, in which the connecting component for connecting to the external structure and the support component are both configured to be fixed to a same flange of the external structure of the turbomachine.

3. The assembly as claimed in claim 1, in which the abutment interacts with the connecting component for connecting to the external structure.

4. The assembly as claimed in claim 1, in which the abutment interacts directly with a radially external wall of the duct.

5. A turbomachine comprising at least one assembly as claimed in claim 1.

* * * * *